Patented Mar. 31, 1942

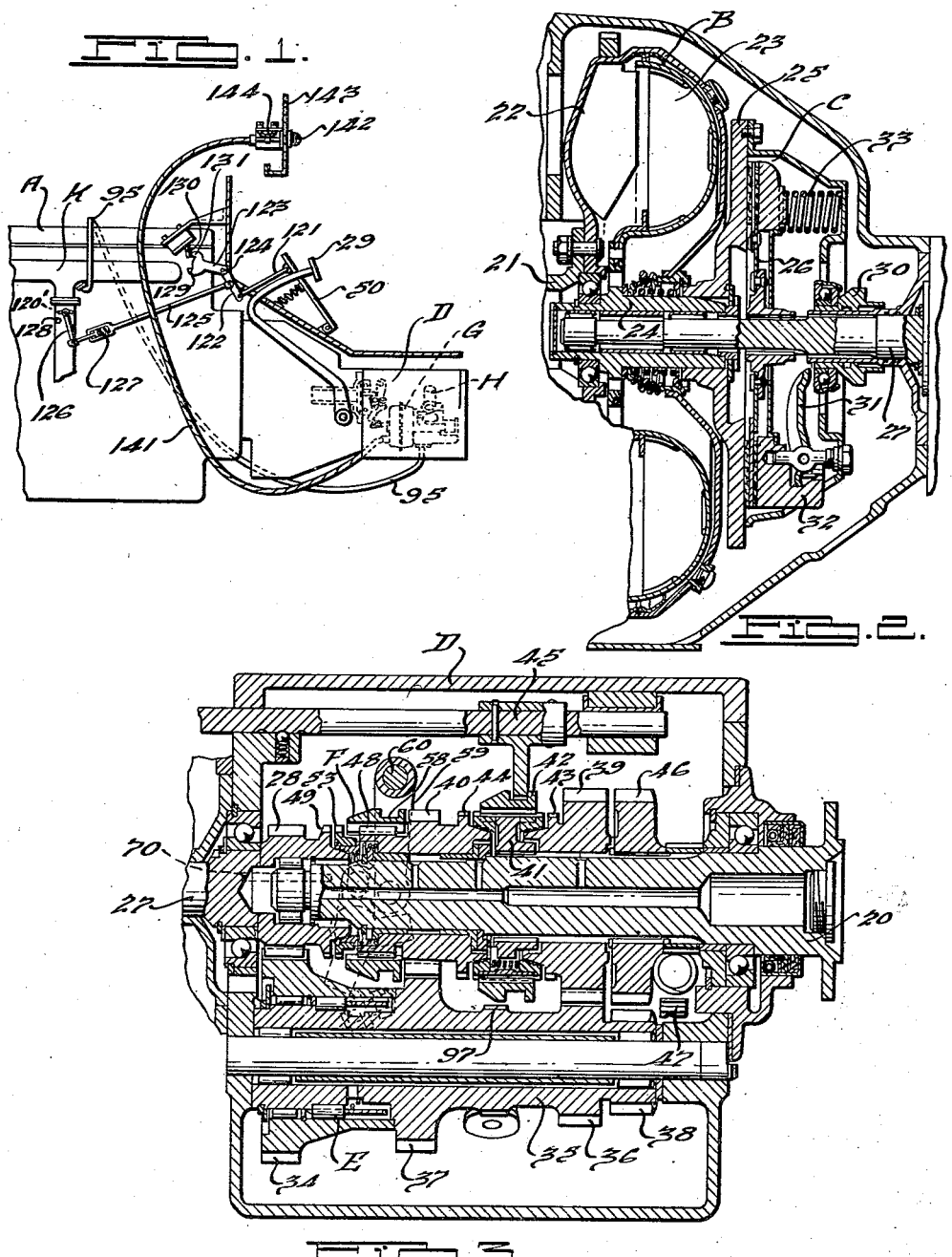

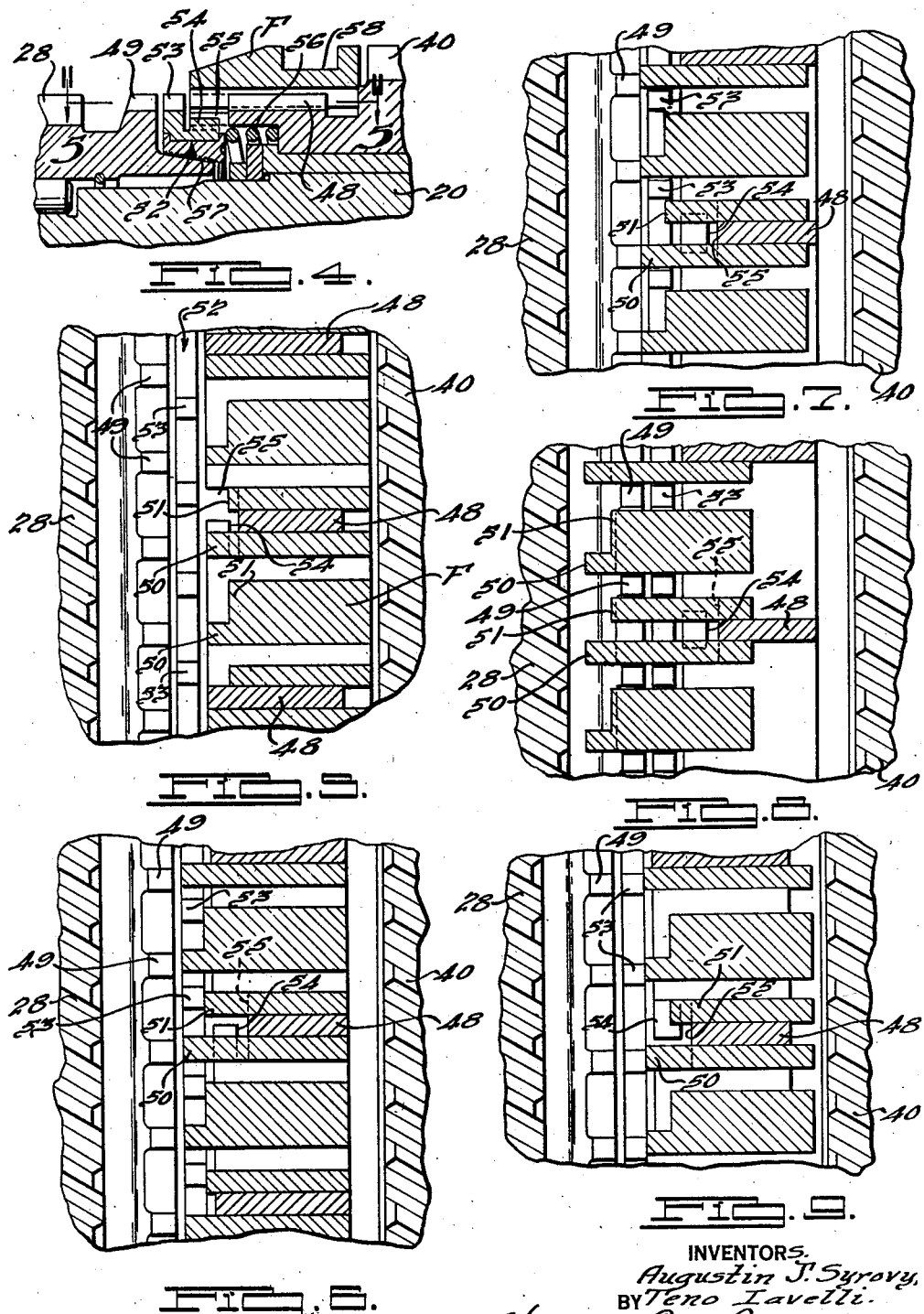

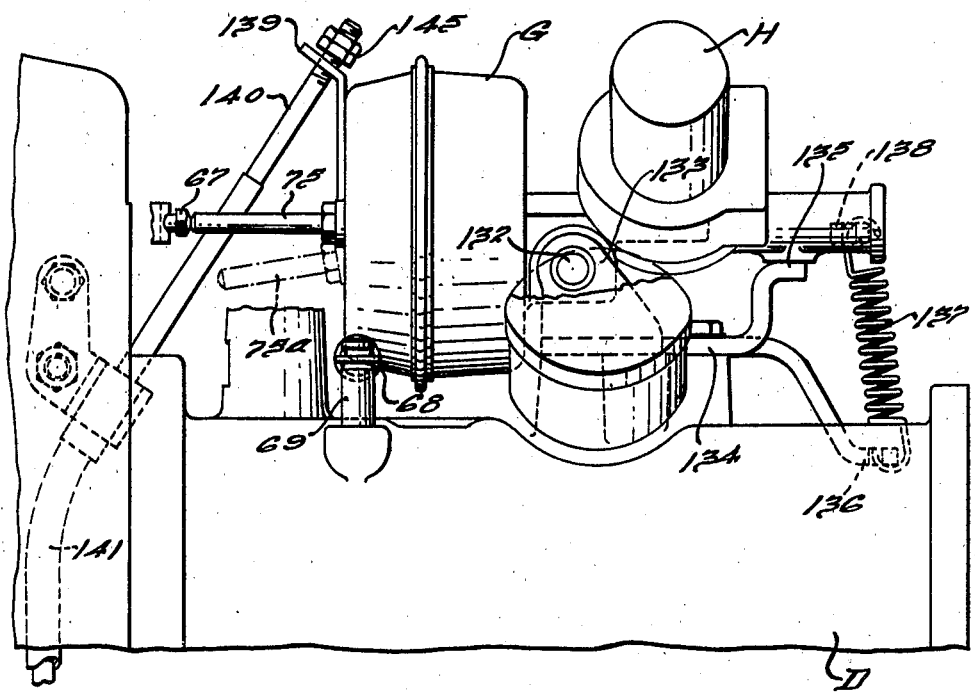

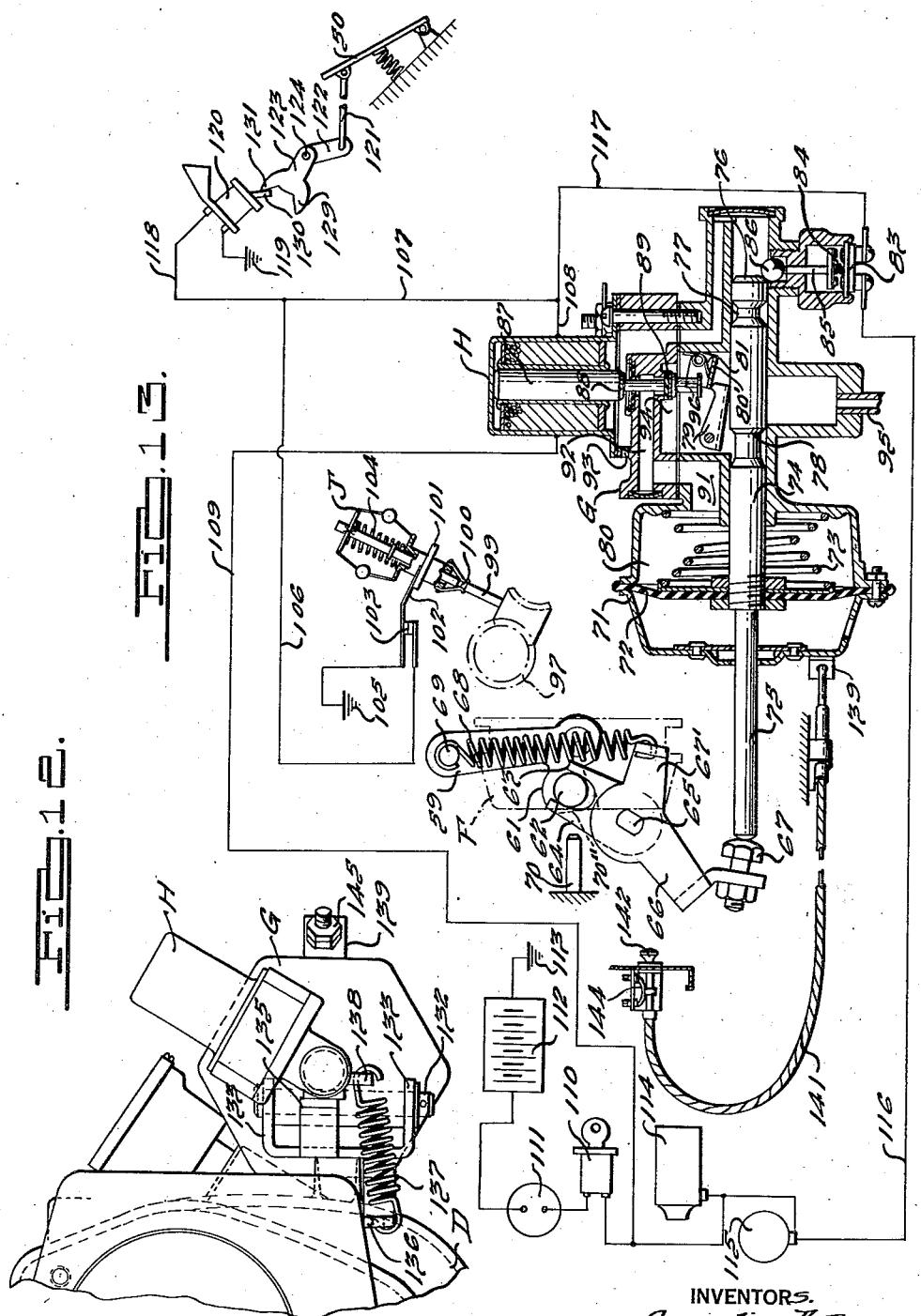

2,277,799

UNITED STATES PATENT OFFICE 2,277,799

POWER TRANSMISSION

Augustin J. Syrovy and Teno Iavelli, Detroit, Mich., assignors to Chrysler Corporation, Highland Park, Mich., a corporation of Delaware Application September 19, 1940, Serial No. 357,374

17 Claims. (Cl. 74—472)

This invention relates to motor vehicles and refers more particularly to power transmission and control mechanism therefor.

Our invention has particular reference to improvements in transmissions of the general character illustrated in the copending application of Carl A. Neracher et al., Serial No. 335,310, filed May 15, 1940.

It is an object of our invention to provide an improved arrangement of control parts, especially the mechanism for controlling shift of the synchronously engaging clutching sleeve, whereby the parts are more compactly arranged, provide more positive and direct operation of thrust transmission, and accommodate installation where interference with other parts of the motor vehicle are less likely.

Another object of our invention is to provide a sleeve operating motor which is capable of assembly at the transmission itself, together with a novel system of operating linkage between the motor and drive controlling sleeve.

A further object of our invention is to provide an improved arrangement for controlling manual shift of the automatic clutching sleeve.

Further objects and advantages of our invention will be more apparent from the following illustrative embodiments thereof, reference being had to the accompanying drawings in which:

Fig. 1 is a side elevational view showing a motor vehicle engine and power transmission equipped with our invention.

Fig. 2 is a longitudinal sectional elevational view through the main clutching mechanism.

Fig. 3 is a similar view through the change speed transmission.

Fig. 4 is a detail enlarged view of the blocker switch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the driving blocking condition.

Fig. 7 is a similar view showing the automatic clutching sleeve in its coasting relationship from the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a top plan view of a portion of the transmission showing our sleeve-operating motor assembly swingingly mounted thereon.

Fig. 11 is a transverse elevational view through the transmission showing the linkage for shifting the clutching sleeve.

Fig. 12 is an end elevational view of a portion of the transmission and showing the Fig. 10 motor assembly.

Fig. 13 is a diagrammatic view of the control mechanism for the automatic clutching sleeve, the latter being shown in its released position.

Figure 14:
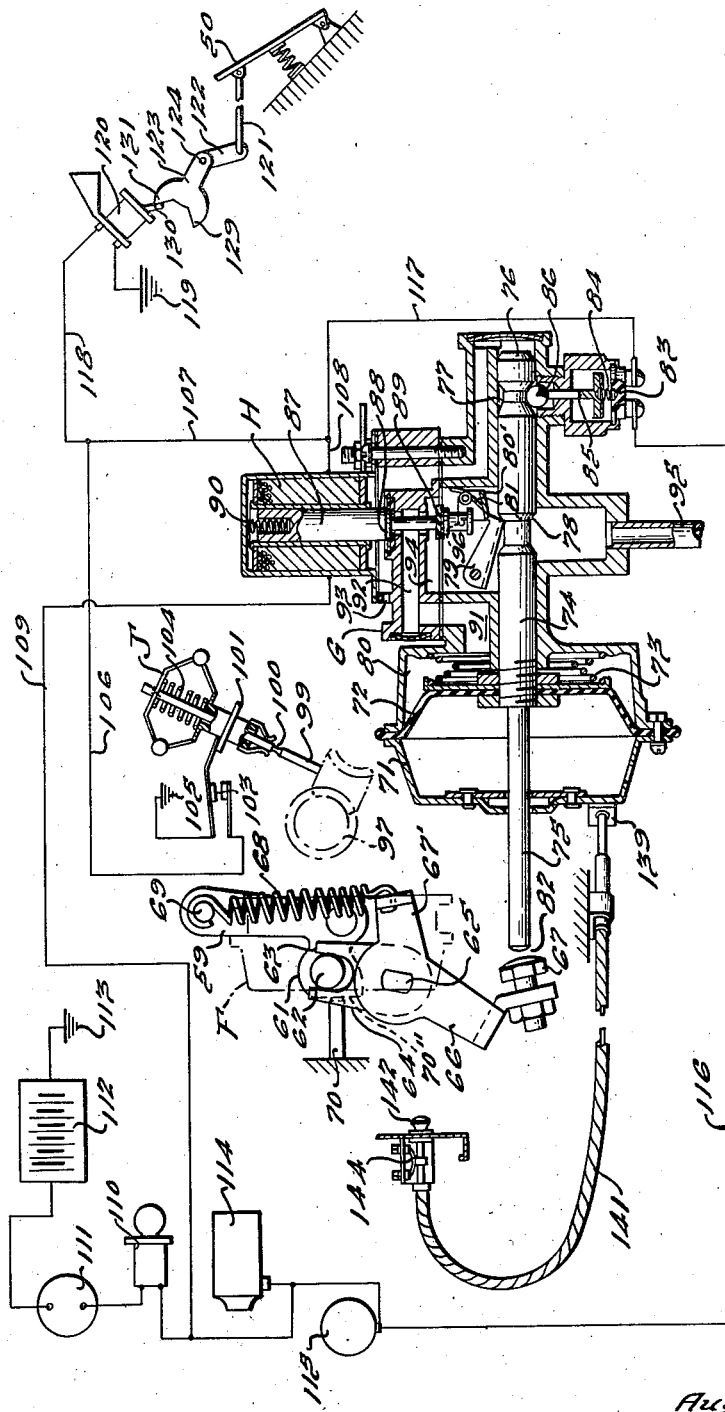
Fig. 14 is a similar view of the control mechanism in another operating position, the automatic clutching sleeve being engaged.

While our control may be employed in conjunction with various types and arrangements of motor vehicle transmissions, in order to illustrate one driving system we have shown our invention in connection with certain salient parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an overrunning clutch E of the usual type such that when shaft 27 drives in its usual clockwise direction (looking from front to rear) then clutch E will engage to lock gear 34 to countershaft 35 whenever the gear 34 tends to drive faster than the countershaft. However whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver when starting the vehicle from rest, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28 thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50 thereby closing the engine throttle valve and allowing the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with gear 49 so that the blocker tends to rotate with gear 49 within the limits afforded by the travel of lug 54 circumferentially in slot 55.

During drive in first and third, the speed of shaft 27 exceeds the speed of gear 40 so that, if sleeve F is fully released, the parts will be positioned as in Fig. 5 wherein the blocker leads the sleeve F thereby positioning blocker teeth 53 axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of overrunning clutch E, while sleeve F is urged forwardly, then when gear 49 is reduced in speed to that of sleeve F slight further drop in speed of gear 49 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

In the event that sleeve F is urged forwardly from its Fig. 5 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manually shiftable sleeve 42. Then on releasing the accelerator pedal the sleeve F will synchronously clutch with teeth 49 during coast to step-up the drive to either second or fourth as aforesaid.

The transmission is provided with suitable prime mover means for controlling shift of sleeve F along with several control means. Referring particularly to Figs. 10 to 14 there is illustrated a pressure fluid operated motor G utilizing air pressure for its operation. For convenience this motor is arranged to operate by the "vacuum" in the intake manifold system of the engine under control of electromagnetic means illustrated in the form of a solenoid H.

Sleeve F is provided with a shift groove 58 engaged as shown in Fig. 11 by the depending arms of a yoke 59 secured to a rock shaft 60 which has its ends rotatably supported in the housing of transmission D. One arm of yoke 59 has a forward lever extension 61 carrying a pin 62 which is engaged by the forked end portion 63 of a lever 64 fixed to the inner end of a rockshaft 65. This rockshaft has an outer end extending outside the transmission casing where it carries the depending lever 66 which is fixed to rockshaft 65. Lever 66 constitutes what may be termed a follower member and carries an adjustable set screw 67 forming an operating abutment portion of the lever. This lever 66 has another lever arm 67' extending rearwardly therefrom and is engaged by one end of a tension coil spring 68. The upper end of this spring is anchored to the cantilever end of a pin 69 which is seated in one of the casing journals 70' for rotatably supporting the rockshaft 60.

Forward clutching shift of sleeve F is effected, under control of motor G, by the spring 68 exerting a pull on lever 67 in a counterclockwise direction as viewed in Figs. 13 and 14. This rotary motion of lever 67 is transferred through rockshaft 65 and lever 64 to pin 62 thereby thrusting sleeve F forwardly. Forward shift of sleeve F is suitably limited as by stop pin 70 which is fixed to the casing and projects therefrom for engagement by the forward flat face 70" of the yoke extension 61 when sleeve F is fully clutched as in Fig. 14.

Motor G comprises a casing 71 containing the diaphragm piston 72 urged in a direction to release sleeve F by a spring 73 which is much stronger than the action of spring 68 so that when spring 73 expands, its force will readily stretch spring 68. Diaphragm piston 72 is connected to a leader member in the form of a rod 74 which has a forward extension 75 aligned with the abutment portion 67 of lever 66.

Rod 74 has a series of detents 76, 77 and 78, the latter cooperating with a pivoting latch 79 such that when vacuum is admitted to chamber 80 to cause the piston 72 and rod 74 to assume their Fig. 14 positions, latch 79 under action of pivoted latch-operating part 80' and rat-trap spring 81 catches on the rear shoulder of detent 78 and holds the parts as in Fig. 14. At this time rod portion 75 moves further than lever 66 by the amount of gap 82, the stop 70 acting on yoke extension 61 limiting forward movement of sleeve F by spring 68.

In order to provide for release of sleeve F, it is desirable to provide some means for momentarily relieving the torque load at the teeth 49 and sleeve F and in the present instance we have provided such means as a system of grounding the primary wire of the usual distributer of the ignition system whereby the engine ignition may be momentarily rendered ineffective thereby unloading the torque at sleeve F sufficiently to insure its release by spring 73. This ignition interrupting system is, under control of an interrupter switch 83 which is closed against the action of a switch-opening spring 84 by plunger 85 and ball 86 whenever rod 74 moves between the Fig. 14 and Fig. 13 positions by reason of the enlarged rod portion between detents 76, 77. Detent 77 is so arranged that, with the parts as in Fig. 14 and sleeve F clutched, rod 74 may move forwardly sufficiently to close gap 82 at the lost-motion between rod portion 75 and lever 66, this movement causing switch 83 to close and ground the ignition system whereupon spring 73 may then cause further movement of rod 75 to release sleeve F, the switch 83 then opening by detent 76 to restore the ignition system.

The vacuum supply to chamber 80 is under control of solenoid H which comprises an armature plunger 87 having valving parts 88, 89. In Fig. 13 the solenoid H is energized thereby raising plunger 87 against spring 90 to seat valve 89 and shut off the vacuum supply to chamber 80 and at the same time unseat valve 88 so as to vent this chamber through passage 91, chamber 92 and vent passage 93. When the solenoid is deenergized then spring 90 lowers plunger 87 thereby seating valve 88 to shut off vent 93 and open valve 89 as in Fig. 14 thereby opening chamber 80 to the engine intake manifold K through passage 91, chamber 94, and flexible pipe 95.

A certain lost motion is preferably provided between plunger 87 and the inwardly bent finger 96 of latch-operator 80' when in the Fig. 14 position so that when the solenoid H is energized, the plunger 87 strikes the latch-operator and swings it upwardly away from latch 79. The latch 79 is then free to swing upwardly by reason of the relationship between the angle of the shoulder at detent 78 and the pivot point of latch 79, thereby releasing rod 74 for forward movement by spring 73 to release sleeve F. Then when the solenoid is deenergized, the plunger 87 is free to move downwardly allowing the latch 79 to subsequently catch at detent 78 when vacuum operates piston 72, the parts then remaining in the Fig. 14 position independently of vacuum in chamber 80 until solenoid H is again energized to release the latch and vent chamber 80.

It is deemed preferable to provide a speed control on the energization of solenoid H so as to insure automatic release of sleeve F below a predetermined car speed and automatic engagement of sleeve F above a predetermined car speed. Whenever the car is in forward driving condition the manual sleeve 42 is either shifted rearwardly to the low range or forwardly to the high range so that by driving a governer from the countershaft 35 it is possible to provide a speed control operated proportionate to the speed of travel of the car. Driven from countershaft gear 97 is a governor J of any suitable type, this governor operating a sleeve 98 outwardly along its drive shaft 99 as the car speed reaches a predetermined point, the break-away being under control of a detent 100 if desired.

The sleeve 98 has a shoulder 101 engaged by the swinging switch piece 102 of the governor switch 103. When the car is stationary the detent 100 is engaged and switch 103 is closed. As the car accelerates the governor eventually reaches its critical speed and detent 100 releases thereby causing switch 103 to open. As the car slows down, the governor spring 104 restores the parts to the Fig. 13 position and by proportioning the various parts it is obvious that switch 103 may be made to function at desired speeds proportionate to car travel. As an example of one arrangement of governor operation and gearing arrangement, the governor may be made to open switch 103 during car acceleration in first and third respectively at approximately 7 and 15 M. P. H. (miles per hour), the switch 103 closing on stopping the car in direct and second at approximately 7 and 3 M. P. H. respectively.

The governor solenoid circuit under control of switch 103 comprises ground 105 to switch 103 thence through conductors 106, 107 and 108 to solenoid H thence by conductor 109 to ignition switch 110, ammeter 111, battery 112 and ground 113.

In Fig. 13 we have illustrated a portion of the engine ignition circuit which extends from battery 112 and ammeter 111 to ignition switch 110 thence to coil 114 and distributor 115.

The ignition grounding circuit for rendering the ignition momentarily inoperative comprises a grounding conductor 116 extending from the distributor 115 to ignition interrupter switch 83 thence by conductor 117 to conductor 107 which has a branch 118 extending to ground 119 under control of a switch 120 called the kick-down switch because it is controlled by the accelerator pedal 50 when fully depressed to effect step-down in the transmission speed ratio.

The kick-down solenoid circuit extends from ground 119 through switch 120 and conductors 118, 107 and 108 through solenoid H and conductor 109 and thence through ignition switch 110 to ground 113 just as for the governor solenoid circuit.

The kick-down switch 120 is preferably closed when the engine throttle valve 120' (Fig. 1) is fully open. This may be accomplished by arranging the accelerator pedal 50 for a movement overtravelling its wide open throttle position. Pedal 50 operates a link 121 so as to swing bell crank lever 122, 123 about its pivot 124. Lever arm 122 operates link 125 which is connected to throttle valve lever 126 through a lost motion spring 127. Ordinarily this spring affords a solid connection between link 125 and lever 126 but when pedal 50 is depressed to cause lever 126 to engage stop 128 at wide open throttle, then further depression of pedal 50 will cause finger 129 of lever arm 123 to throw arm 130 of switch 120 upwardly closing switch 120, the spring 127 yielding to accommodate this overtravelling movement of the accelerator pedal. When the pedal is released, then finger 131 restores switch 119 to open the kick-down solenoid circuit.

The motor G, including rod 74, solenoid H and switch 83, is pivotally or swingingly mounted on the side of the transmission D. By swinging the motor about its pivot, rod 75 may be misaligned with respect to lever 66 so that the motor is, in effect, rendered inoperative insofar as it has any control on sleeve F. This allows spring 68 to engage sleeve F independently of vacuum and the sleeve, once engaged, will remain engaged as long as the motor remains in its inoperative position. In instances where for any reason the motor G cannot operate, as when it is desired to start a dead engine by towing the car, sleeve F may therefore be engaged under manual control independently of vacuum. If the vacuum system should fail then the manual control or engagement of sleeve F will allow drive in the transmission in second, fourth and reverse by selective manual shift of sleeve 42 or gear 47.

The pivotal mounting of motor G is best illustrated in Figs. 10 and 12. The motor is mounted on a vertical pivot pin 132 which is supported between the vertically spaced horizontally projecting ears 133 of a bracket 134 fixed to the side of the housing of transmission D. This bracket has a pair of relatively offset rear end portions 135 and 136. Bracket portion 135 provides a stop for the motor when the latter is in its normal operative position as illustrated. Bracket portion 136 anchors one end of a tension coil spring 137 the other end of which engages a lug 138 formed on the rear end region of the motor. Spring 137 normally holds motor G in the illustrated Fig. 10 position for controlling shift of sleeve F.

In order to swing the motor about the pivot pin 132 so as to misalign leader rod 75 and follower lever 66, the motor is provided with an actuating ear 139 slidably engaged by the rod portion 140 of a Bowden wire mechanism 141, as seen in Figs. 1 and 13, extends to the operating knob 142 at the usual dash 143 of the vehicle. If desired, a conventional detent or equivalent mechanism 144 may be provided to releasably hold knob 142 when pulled out by the driver. When this knob is pulled, then the adjustable abutment nuts 145 on the end of rod 140 engage ear 139 and the entire motor unit is swung about pivot pin 132 against the restoring force of spring 137 until rod 75 is in the position 75ᵃ in Fig. 10. When in this position the spring 68 is free to engage sleeve F whenever the sleeve is synchronized with the pinion teeth 49 as set forth in the aforesaid Neracher et al. application. When it is desired to restore the transmission to the automatic control of motor G then the operator releases knob 142 and spring 137 will restore motor G to the Fig. 10 position. If, when the knob 142 is released, the rod 75 is in its projected position, then the rod 75 will overlap lever 66 and motor G will not fully return to its Fig. 10 position under action of spring 137 until the next time that vacuum acts in chamber 80 to retract and latch rod 75. However, knob 142 is allowed to be fully released in advance of restoring the motor to its Fig. 10 position by reason of the sliding engagement between rod 140 and ear 139.

In the operation of the mechanism, the car at standstill and with the ignition switch 110 closed and the engine idling will cause the solenoid H to be energized as in Fig. 13 because governor switch 103 is closed thereby establishing the governor solenoid circuit. Cylinder 80 is vented and sleeve F disengaged. The driver shifts sleeve 42 to either the high or low range and accelerates the car ordinarily above the critical speed of governor J thereby causing switch 103 to open. As vacuum builds up in the engine intake manifold K, plunger 87 now being lowered by spring 90 because switch 103 is open, piston 72 will be operated by vacuum thereby moving rod 74 to its Fig. 14 latched position. As soon as the driver allows the engine to coast, sleeve F will engage teeth 49 synchronously, to step-up the drive to either second or fourth although the step-up will be delayed until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor J directs a downshift on bringing the car to rest. Thus there is automatically provided a favorable torque-multiplying gearing for starting, as in third.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is fully depressed for the kick-down, switch 120 closes thereby energizing the kick-down solenoid circuit and causing solenoid H to raise plunger 87 and release latch 79 thereby venting chamber 80. At this time the sleeve F is under driving torque from the engine operating under wide open throttle. However, when latch 79 is released, spring 73 operates rod 75 forwardly sufficiently to close gap 82 thereby closing the interrupter switch 83 and grounding the engine ignition system. This relieves the torque at sleeve F and spring 73 then operates to release the sleeve whereupon the ignition is restored at detent 76 and the engine quickly speeds up to engage overrunning clutch E for establishing the third or first driving ratio depending on the setting of sleeve 42 prior to the kick-down operation.

On bringing the car to a stop when sleeve F is clutched as in fourth for example, the governor J will direct a step-down shift in the transmission by closing governor switch 103 and establishing the governor solenoid circuit to vent chamber 80 and allow spring 73 to release sleeve F. This assures acceleration of the car in third, assuming clutch 42 is left in its forward position of shift, with automatic step-up to fourth upon release of the accelerator pedal above the speed at which governor switch 103 opens.

For sustained drive in second or fourth independent of motor G, the driver pulls knob 142 to swing motor G about pivot 132 thereby misaligning rod 75 and lever 66 whereupon spring 68 is free to shift sleeve F forwardly to its clutching position. Release of knob 142 will restore sleeve F to control of motor G.

We claim:

1. In a power transmission for driving a motor vehicle having an engine; a speed ratio varying transmission comprising change speed means operable to provide step-up and step-down change in the speed ratio drive from the engine to the vehicle; said change speed means including relatively engageable drive control elements, means biasing said elements into relatively engaging relationship, and a follower member operably connected to one of said elements for effecting relative disengagement of said elements; a prime mover adapted to be positioned in operating relationship with respect to said change speed mechanism and including a thrust-transmitting leader member adapted for thrust-transmitting movement in a path containing said follower member to overcome said biasing means, thereby to effect relative disengagement of said elements, and for return movement to accommodate relative engagement of said elements by said biasing means; means for mounting said prime mover so as to accommodate operation thereof in its said position and for movement thereof to a second position wherein said leader member is displaced out of said path free from thrust-transmitting relationship with respect to said follower member; and means for effecting movement of said prime mover from each of said positions to the other.

2. In a power transmission for driving a motor vehicle having an engine; a speed ratio varying transmission comprising change speed means operable to provide step-up and step-down change in the speed ratio drive from the engine to the vehicle; said change speed means including relatively engageable drive control elements, means biasing said elements into relatively engaging relationship, and a follower member operably connected to one of said elements for effecting relative disengagement of said elements; a prime mover adapted to be positioned in operating relationship with respect to said change speed mechanism and including a thrust-transmitting leader member adapted for thrust-transmitting movement in a path containing said follower member to overcome said biasing means, thereby to effect relative disengagement of said elements, and for return movement to accommodate relative engagement of said elements by said biasing means; means for mounting said prime mover so as to accommodate operation thereof in its said position and for movement thereof to a second position wherein said leader member is displaced out of said path free from thrust-transmitting relationship with respect to said follower member; a spring yieldingly holding said prime mover in its said first position; and means operable under control of the vehicle driver for moving said prime mover from its said first position to its said second position.

3. In a power transmission for driving a motor vehicle having an engine; a speed ratio varying transmission comprising change speed means operable to provide step-up and step-down change in the speed ratio drive from the engine to the vehicle; a prime mover adapted to be positioned in operating relationship with respect to said change speed mechanism for controlling operation thereof; means for mounting said prime mover so as to accommodate operation thereof in its said position and for movement thereof to a second position out of said operation relationship; and means for effecting movement of said prime mover from each of said positions to the other; said change speed means comprising means operating when said prime mover is moved to its said second position for effecting sustained drive relationship in said transmission.

4. In a power transmission for driving a motor vehicle having an engine; a speed ratio varying transmission comprising change speed means operable to provide step-up and step-down change in the speed ratio drive from the engine to the vehicle, said change speed means comprising a follower operating element adapted for operation to change said speed ratio drive; a prime mover comprising a leader operating element carried thereby and adapted to operate said follower element; means for mounting said prime mover for swinging movement from a first position thereof to a second position; said leader element being disposed in operating relationship with respect to said follower element when said prime mover is disposed in its said first position and entirely free from any operating relationship with respect to said transmission when said prime mover is disposed in its said second position; and means for effecting said swinging movement of said prime mover.

5. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; a follower member having a thrust-receiving portion operably connected to said shiftable element; a leader member having a thrust-imparting portion adapted to transmit thrust to the thrust-receiving portion of said follower member; a vacuum motor for operating said leader member; means for mounting said motor for swinging movement thereof for selectively establishing either an operative or an inoperative thrust-transmitting relationship between said leader and follower portions; said motor comprising thrust-applying means for said leader member operable, when said operative thrust-transmitting relationship is established, to cause thrust of said follower member so as to shift said shiftable element out of said engagement; means for imparting said swinging movement to said motor thereby to establish said inoperative thrust-transmitting relationship; and means yieldingly acting on said shiftable element for effecting said engaging shift thereof when said inoperative thrust-transmitting relationship is established.

6. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; prime mover means comprising a leader member operable to control said shift of said shiftable element and adapted for movement between operative and released positions thereof respectively corresponding to engagement and disengagement of said shiftable element as aforesaid; spring means yieldingly urging said leader member to its said released position; means comprising a follower member operably connected with said shiftable element; second spring means acting with less force than the first said spring means to urge said engagement of said shiftable element; means for mounting said prime mover means for movement thereof relative to said follower member; means operable under control of the vehicle driver for effecting movement of said prime mover means on its said mounting means so as to provide either an operative relationship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated; and means for controlling operation of said prime mover means.

7. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive when torque transmission between said drive control elements is diminished; prime mover means comprising a leader member operable to control said shift of said shiftable element and adapted for movement between operative and released positions thereof respectively corresponding to engagement and disengagement of said shiftable element as aforesaid; spring means yieldingly urging said leader member to its said released position; releasable holding means adapted to releasably hold said leader member in its said operative position, and when released, to accommodate movement of said leader member to its said released position by said spring means; means comprising a follower member operably connected with said shiftable element; second spring means acting with less force than the first said spring means to urge said engagement of said shiftable element; means for mounting said prime mover means for movement thereof relative to said follower member; means operable under control of the vehicle driver for effecting movement of said prime mover means on its said mounting means so as to provide either an operative relationship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated; a vehicle drive control element adapted for manipulation by the vehicle driver; and means operable in response to driver manipulation of said control element for controlling said holding means and effecting momentary diminution of said torque transmission.

8. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive when torque transmission between said drive control elements is diminished; prime mover means comprising a leader member operable to control said shift of said shiftable element and adapted for movement between operative and released positions thereof respectively corresponding to engagement and disengagement of said shiftable element as aforesaid; spring means yieldingly urging said leader member to its said released position; means comprising a follower member operably connected with said shiftable element; second spring means acting with less force than the first said spring means to urge said engagement of said shiftable element; means for mounting said prime mover means for movement thereof relative to said follower member; means operable under control of the vehicle driver for effecting movement of said prime mover means on its said mounting means so as to provide either an operative relatioship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated; and vehicle speed responsive means for controlling operation of said prime mover means and effecting momentary diminution of said torque transmission.

9. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; a follower member having a thrust-receiving portion operably connected to said shiftable element; a leader member having a thrust-imparting portion adapted to transmit thrust to the thrust-receiving portion of said follower member; a vacuum motor for operating said leader member; means for mounting said motor for swinging movement thereof for selectively establishing either an operative or an inoperative thrust-transmitting relationship between said leader and follower portions; said motor comprising thrust-applying means for said leader member operable, when said operative thrust-transmitting relationship is established, to cause thrust of said follower member so as to shift said shiftable element out of said engagement; means for imparting said swinging movement to said motor thereby to establish said inoperative thrust-transmitting relationship; means yieldingly acting on said shiftable element for effecting said engaging shift thereof when said inoperative thrust-transmitting relationship is established; vacuum means operable to retract said leader member in lost motion relationship with respect to said follower member such that on venting said vacuum means, said thrust-applying means will move said leader member relative to said follower member in taking up said lost motion until said thrust-transmitting relationship is established; and means for varying torque transmission between said drive control elements in response to said movement of said leader member relative to said follower member.

10. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; a follower member having a thrust-receiving portion operably connected to said shiftable element; a leader member having a thrust-imparting portion adapted to transmit thrust to the thrust-receiving portion of said follower member; a vacuum motor for operating said leader member; means for mounting said motor for swinging movement thereof for selectively establishing either an operative or an inoperative thrust-transmitting relationship between said leader and follower portions; said motor comprising thrust-applying means for said leader member operable, when said operative thrust-transmitting relationship is established, to cause thrust of said follower member so as to shift said shiftable element out of said engagement; means for imparting said swinging movement to said motor thereby to establish said inoperative thrust-transmitting relationship; means yieldingly acting on said shiftable element for effecting said engaging shift thereof when said inoperative thrust-transmitting relationship is established; said motor comprising vacuum means operable to retract said leader member in lost motion relationship with respect to said follower member such that on venting said vacuum means, said thrust-applying means will move said leader member relative to said follower member in taking up said lost motion until said thrust-transmitting relationship is established; means for varying torque transmission between said drive control elements in response to said moveement of said leader member relative to said follower member; means operable to releasably hold said leader member when the latter is retracted as aforesaid; and vehicle speed responsive means for controlling said holding means.

11. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; a follower member having a thrust-receiving portion operably connected to said shiftable element; a leader member having a thrust-imparting portion adapted to transmit thrust to the thrust-receiving portion of said follower member; a vacuum motor for operating said leader member; means for mounting said motor for swinging movement thereof for selectively establishing either an operative or an inoperative thrust-transmitting relationship between said leader and follower portions; said motor comprising thrust-applying means for said leader member operable, when said operative thrust-transmitting relationship is established, to cause thrust of said follower member so as to shift said shiftable element out of said engagement; means for imparting said swinging movement to said motor thereby to establish said inoperative thrust-transmitting relationship; means yieldingly acting on said shiftable element for effecting said engaging shift thereof when said inoperative thrust-transmitting relationship is established; said motor comprising vacuum means operable to retract said leader member in lost motion relationship with respect to said follower member such that on venting said vacuum means, said thrust-applying means will move said leader member relative to said follower member in taking up said lost motion until said thrust-transmitting relationship is established; means operable to vent said vacuum means; means for varying torque transmission between said drive control elements in response to said movement of said leader member relative to said follower member; a vehicle drive control element adapted for manipulation of the vehicle driver; and means operable in response to driver manipulation of said control element for controlling operation of said venting means.

12. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; prime mover means comprising a leader member operable to control said shift of said shiftable element and adapted for movement between operative and released positions thereof respectively corresponding to engagement and disengagement of said shiftable element as aforesaid; spring means yieldingly urging said leader member to its said released position; means comprising a follower member operably connected with said shiftable element; second spring means acting with less force than the first said spring means to urge said engagement of said shiftable element; means for mounting said prime mover means for movement thereof relative to said follower member; and means operable under control of the vehicle driver for effecting movement of said prime mover means on its said mounting means so as to provide either an operative relationship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated.

13. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; prime mover means operable to control drive-establishing and drive-releasing movement of said movable drive control element, said prime mover means comprising a leader part movable from a first position to a second position to accommodate drive-establishing movement of said movable drive control element; a first spring yieldingly urging said leader part to its said first position; a follower part operably connected to said movable drive control element and adapted for movement from a first position to a second position for imparting drive-releasing movement to said movable drive control element; a second spring acting with less force than the said first spring to yieldingly urge said follower part to its said first position; means for mounting said prime mover means for movement thereof relative to said follower part; and means operable under control of the vehicle driver for effecting movement of said prime mover means on its said mounting means so as to provide either an operative relationship between said leader and follower parts such that movement of said leader part from its said second position to its first position by the said first spring will operate through said follower part to move the latter from its said first position to its second position and accommodating movement of said leader part from its said first position to its second position while said follower part remains approximately in its said second position, or an inoperative relationship between said leader and follower parts such that movement of said follower part from its said second position to its first position by said second spring is accommodated while said leader part remains in its said first position.

14. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is movable relatively to the other to establish and release said speed ratio drive; a pressure fluid motor operable to control drive-establishing and drive-releasing movement of said movable drive control element, said motor comprising a piston operable by pressure fluid from a first position to a second position thereof; a spring yieldingly urging said piston to its said first position; piston operated means for transmitting movement from said piston to said movable drive control element and adapted for movement from a first position to a second position for imparting drive-releasing movement to said movable drive control element; yielding means operating to urge drive-establishing movement of said movable drive control element when said piston is operated by pressure fluid and so constructed and arranged as to accommodate pressure fluid operation of said piston in advance of drive-establishing movement of said movable drive control element; means for mounting said motor for swinging movement; and manually controlled means operable by the vehicle driver for imparting swinging movement to said motor thereby to accommodate drive-establishing movement of said movable drive control element by said yielding means independently of pressure fluid operation of said piston.

15. In a power transmission for driving a motor vehicle having an engine; a speed ratio varying transmission comprising change speed means operable to provide step-up and step-down change in the speed ratio drive from the engine to the vehicle; said change speed means including relatively engageable drive control elements, means biasing said elements into relatively engaging relationship, and a follower member operably connected to one of said elements for effecting relative disengagement of said elements; a thrust-transmitting leader member adapted for thrust-transmitting movement in a path containing said follower member to overcome said biasing means, thereby to effect relative disengagement of said elements, and for return movement to accommodate relative engagement of said elements by said biasing means; and means for mounting said leader member for displacement between two positions in one of which said leader member is disposed for thrust-transmitting movement in said path and in the other of which said leader member is displaced out of said path free from thrust-transmitting relationship with respect to said follower member.

16. In a power transmission according to claim 15; means acting to bias said leader member for its said thrust-transmitting movement, this biasing means acting to overcome the first said biasing means as aforesaid; and power means for effecting said return movement of said leader member against the action of the second said biasing means.

17. In a power transmission according to claim 15; means acting to bias said leader member for its said thrust-transmitting movement, this biasing means acting to overcome the first said biasing means as aforesaid; vacuum applying means for effecting said return movement of said leader member against the action of the second said biasing means; and means for releasably holding said leader member in its position of return movement independently of said vacuum applying means.

AUGUSTIN J. SYROVY.
TENO IAVELLI.